(12) United States Patent
Trumbly

(10) Patent No.: US 6,480,316 B1
(45) Date of Patent: Nov. 12, 2002

(54) SYSTEM AND METHOD FOR READING DATA CONTENT OUT OF OPTICAL DATA STREAM WITHOUT ALTERING THE OPTICAL DATA STREAM

(75) Inventor: William D. Trumbly, Bonham, TX (US)

(73) Assignee: Yotta Networks, Plano, TX (US)

( * ) Notice: Subject to any disclaimer, the term of this patent is extended or adjusted under 35 U.S.C. 154(b) by 0 days.

(21) Appl. No.: 09/681,849

(22) Filed: Jun. 15, 2001

(51) Int. Cl.$^7$ .............................. H04B 10/06; H01S 3/00
(52) U.S. Cl. ....................................... 359/189; 359/333
(58) Field of Search ................. 359/110, 844, 359/237; 372/44, 46

(56) References Cited

U.S. PATENT DOCUMENTS

| | | | |
|---|---|---|---|
| 4,918,396 A | 4/1990 | Halemane et al. ............ 330/4.3 |
| 5,063,567 A | 11/1991 | Nakajima ..................... 372/28 |
| 5,099,350 A | * 3/1992 | Hisao ......................... 359/180 |
| 5,546,218 A | 8/1996 | Komatsubara et al. ....... 359/237 |
| 5,559,323 A | 9/1996 | Campi et al. ............. 250/214.1 |
| 5,781,578 A | 7/1998 | Takagi ........................ 372/50 |
| 5,991,060 A | 11/1999 | Fishman et al. ............ 359/187 |

FOREIGN PATENT DOCUMENTS

JP 411330613 A 11/1999 ............. H01S/3/18

OTHER PUBLICATIONS

Riishoj et al., 4 Gb/s Two–Level to 2 Gsybmol/s Four–Level Converter GaAs IC for Semiconductor Optical Amplifier Modulators GAASIC Technical Digest 1993. 15$^{th}$ Annual, pp. 299–301.

Ghafouri–Shiraz, Fundamentals of Laser Diodes, John Wiley & Sons, 1996, pp. 149–157.

Becker et al., Erbium Doped Fiber Amplifiers Fundamentals and Technology, Academic Press, 1999, pp. 57–59.

K.T. Koai and R. Olshansky, IEEE Photonics Technology Letters, vol. 4, No. 5, May, 1992 *"Simultaneous Optical Amplification, Detection, and Transmission Using In–Line Semiconductor Laser Amplifiers"*.

\* cited by examiner

*Primary Examiner*—Thomas H. Tarcza
*Assistant Examiner*—Deandra M. Hughes
(74) *Attorney, Agent, or Firm*—Gray Cary Ware & Freidenrich

(57) ABSTRACT

Systems and methods for generating an electrical copy of an optical signal without having to terminate the optical signal. In one embodiment, an optical amplifier is configured to receive the optical signal and to allow the optical signal to pass therethrough. The optical amplifier is "pumped" by applying a bias voltage across it. The optical signal passing through the optical amplifier causes a population inversion within the optical amplifier to alternately collapse and recharge. A resistor is placed in series with the optical amplifier so that the bias current through the optical amplifier generates a voltage across the resistor which mirrors the optical signal. Both the optical signal and the electrical signal are provided as outputs.

20 Claims, 8 Drawing Sheets

SYSTEM AND METHOD FOR READING DATA CONTENT OUT OF OPTICAL DATA STREAM WITHOUT ALTERING THE OPTICAL DATA STREAM

BACKGROUND OF INVENTION

1. Field of the Invention

The invention relates generally to systems and methods for the communication of data and more particularly to systems and methods for producing an electrical copy of an optical data stream without altering the optical data stream.

2. Background of the Invention

With the increased computing power that is available for both commercial and private use, there is an increased demand for data transfer on a number of levels. Particularly, the emergence of the Internet and the ability of businesses and individuals to easily communicate with others around the world has created a need for greater data transfer speed, quality and capacity than ever before.

One response to the demand for increased performance in data transfers has been the development of optical data transfer systems. These systems use light instead of electrical signals to carry data from one point to another. Optical data transfer systems typically have much greater bandwidth than electrical systems of comparable size and cost and are capable of providing higher quality signals for data transmission. Ideally, a user who wishes to transport data via optical signals can transmit the data over an optical fiber which is coupled by optical routing and switching equipment to more optical fibers. The transmission of the data entirely in the form of optical signals provides for a fast, efficient and high-quality transport mechanism.

One of the problems with handling optical signals, however, is that, in conventional systems, they must be converted to electrical signals in order to process the data. For example, an optical signal which is transmitted over an optical fiber to a destination device is received and converted into an electrical signal which is then processed by the device. Similarly, when an optical signal is routed, it is normally converted from an optical signal to an electrical signal by the routing equipment, which then makes a routing decision for the signal, converts the electrical signal back into an optical signal and routes the optical signal over a selected path.

The necessity of converting an optical signal into an electrical signal for processing is problematic for a number of reasons. For instance, the process of converting the data requires a certain amount of time. While this amount of time may be small, the number of conversions which may be necessary to route the data stream from end to end may create significant latency in the data transmission. Likewise, the power which is required to perform the conversions is not insignificant.

While it is generally accepted that transmissions of optical signals from one optical component to another is faster and more efficient than the transmission of the corresponding data stream through a combination of optical and electrical components, it is nevertheless necessary to use the latter because it has not been possible to determine the content of an optical signal for processing (e.g., routing the signal) without first terminating and converting the optical signal into an electrical signal. It would therefore be desirable to provide a means to determine the content of an optical signal, and thereby enable processing of the data, without having to terminate and convert the optical signal.

SUMMARY OF INVENTION

One or more of the problems outlined above may be solved by the various embodiments of the invention. Broadly speaking, the invention comprises systems and methods for generating an electrical copy of an optical signal without having to terminate the optical signal, as in conventional systems. In one embodiment, an optical amplifier is configured to receive the optical signal and to allow the optical signal to pass therethrough. The optical amplifier is "pumped" by applying a bias voltage across it. The energy provided by the bias voltage causes a number of atoms to become excited and to move into high-energy states, thereby creating a population inversion. Atoms which are in the high-energy states can be stimulated by light passing through the amplifier to fall into lower-energy states, resulting in the emission of photons and the collapse of the population inversion. The impedance of the optical amplifier is high when there is a population inversion and low when the population inversion collapses. Consequently, the bias current which is drawn from the power supply by the optical amplifier increases as the population inversion collapses and decreases as the population inversion is re-established, mirroring the pulses of light in the optical signal. When a resistor is placed in series with the optical amplifier, the bias current creates a voltage across the resistor which also mirrors the optical signal.

In another embodiment, an optical signal is transmitted on an optical fiber to an optical amplifier. The optical signal passes through the optical amplifier to an intermediate optical fiber. The intermediate optical fiber conveys the optical signal to a Bragg filter. The Bragg filter is configured to reduce the noise created in the optical signal by spontaneous emission of photons in the optical amplifier. The filtered optical signal emerging from the Bragg filter is then provided as an output on another optical fiber. A bias voltage is applied to the optical amplifier by a power source. A bias resistor couples the power source through the optical amplifier to ground. The bias current flows from the power source through the optical amplifier, and the bias resistor, producing a signal voltage across the resistor. This signal is amplified by an operational amplifier and provided as an output.

In another embodiment, a system comprises an optical amplifier and an optical processor. The optical amplifier is configured to be electrically biased by a power supply which generates a voltage across it. A population inversion is thereby created in the optical amplifier. The optical amplifier is configured to allow an optical signal to pass through it. As pulses of light from the optical signal pass through the optical amplifier, the population inversion collapses. The collapsing and recharging of the population inversion causes the impedance of the optical amplifier to vary, thereby causing a voltage corresponding to the optical signal to be developed across a resistor placed in series with the optical amplifier and the power supply. The optical signal and corresponding electrical signal are both passed to an optical processor. The optical processor is configured to process the electrical signal and to manipulate the optical signal based upon the results of the processing. The optical processor may be configured to manipulate the optical signal by routing it or by directly modifying one or more bits of the data stream embodied in the optical signal. The optical processor includes an optical fiber line configured to receive the optical signal from the optical amplifier and to delay it by an interval of time which is sufficient to enable the optical processor to implement the manipulation determined by the processing of the electrical signal.

BRIEF DESCRIPTION OF DRAWINGS

Other objects and advantages of the invention may become apparent upon reading the following detailed description and upon reference to the accompanying drawings.

Figure 1:
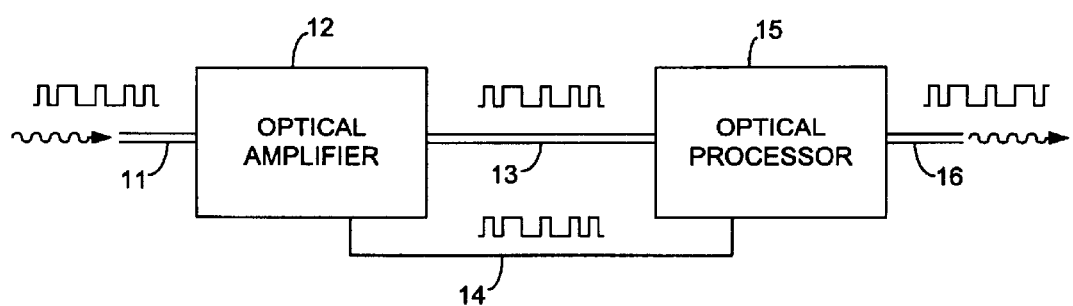
FIG. 1 is a diagram illustrating the generation of an electrical copy of an optical signal and the processing of the optical signal based upon the electrical copy in one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

A preferred embodiment of the invention is described below. It should be noted that this and any other embodiments described below are exemplary and are intended to be illustrative of the invention rather than limiting.

Broadly speaking, the invention comprises systems and methods for generating an electrical copy of an optical signal. In one embodiment, an optical amplifier is configured to receive the optical signal and to allow the optical signal to pass therethrough. The optical amplifier is "pumped" by applying a bias voltage across it. The energy provided by the bias voltage causes a number of atoms to become excited and to move into high-energy states. Atoms which are in the high-energy states can be stimulated by light passing through the amplifier to fall into lower energy states, resulting in the emission of photons of the same wavelength as the light passing through the amplifier. The stimulated emission of these photons amplifies the light passing through the amplifier.

When most of the atoms in the gain material of the optical amplifier are in lowenergy states, some of the energy supplied by the bias voltage is absorbed by the atoms, creating a bias current. As more of the atoms move into higher-energy states, less of the atoms are drawing energy from the bias voltage, so there is less bias current. Viewed another way, the impedance of the optical amplifier increases as more atoms moved into high-energy states. In any case, when light passes through the amplifier, it causes the population inversion to collapse and consequently causes bias current to be drawn. When no light is passing through the amplifier, the population inversion is re-established, and bias current is drawn. As a result, the bias current can be caused to mirror the pulses of light which pass through the optical amplifier, creating an electrical copy of the optical signal.

One of the limitations of handling data which is in an optical form is that, using currently available technologies, that data must be converted into an electrical form before it can be processed. Even in the case of optical data transfers, it is, at times, necessary to convert the data into an electrical form. For instance, optical data is often formatted in packets or frames which include both a payload of useful data and a certain amount of overhead data which carries information necessary to transfer the data from its source to its destination. An optical data stream and may therefore have to be converted from an optical form into an electrical form so that the overhead data can be processed and the corresponding payload data routed to the appropriate destination.

As indicated above, the present invention provides systems and methods for generating an electrical copy of an optical signal so that the data stream embodied in the signal can be accessed without having to terminate the optical signal and then regenerate it for subsequent transmission. This provides a significant advantage over conventional technologies, in which the optical signal was terminated and converted into an electrical form, processed, and then converted back into an optical form.

The present systems and methods take advantage of properties of electrically pumped optical amplifiers which, according to conventional teachings, are more problematic than useful. More particularly, the variations in the impedance of the optical amplifier which result from the buildup and collapse of population inversions within the amplifier material have traditionally been viewed merely as an impediment to the design of a stable power source. The present systems and methods, instead of minimizing or eliminating variations in amplifier impedance and bias current, use these variations to provide an electrical signal which mirrors the data content of the unterminated optical signal.

Referring to FIG. 1, a diagram illustrating the generation of an electrical copy of an optical signal and the processing of the optical signal based upon the electrical copy in one embodiment is shown. As depicted in this figure, the optical signal is transmitted over a first optical transmission medium 11 (e.g., an optical fiber) and is received at an input of optical amplifier 12. The optical signal passes through optical amplifier 12 and emerges at an optical output of optical amplifier 12. In this figure, the optical signal is depicted as being transmitted from the output of the optical amplifier via intermediate transmission medium 13. Intermediate transmission medium 13 carries the optical signal from optical amplifier 12 to optical processor 15.

As the optical signal passes through optical amplifier 12, an electrical copy of the optical signal is generated. An electrical transmission medium 14 is coupled to an electrical output of optical amplifier 12 and is configured to convey the electrical copy of the signal to optical processor 15. Optical processor 15 is configured to access the data embodied in the electrical signal and to perform any processing related to the data (e.g., making routing decisions based upon the overhead data contained in the signal.) Any processing which would conventionally be performed on the electrical signal prior to converting it back into an optical signal is instead performed on the optical signal itself. For instance, if the processing comprises stripping away the old overhead data and replacing it with new overhead data, the optical signal is directly modified in this manner. If no processing of the optical signal is required, it is simply forwarded via optical transmission medium 16 to the appropriate destination (possibly based upon a routing decision generated from the electrical copy of the signal.) It should be noted that the optical signal which emerges from optical amplifier 12 is the same signal which was input to the amplifier, albeit possibly amplified. Likewise, although it may be modified, the optical signal which emerges from optical processor 15 is essentially the same optical signal which was input to the processor. That is, at least a portion of the optical signal which is input to optical processor 15 is simply passed through the processor.

(It should be noted that intermediate transmission medium 13 is used in the depicted embodiment to convey the optical signal from optical amplifier 12 to optical processor 15. Intermediate transmission medium 13 may not be necessary if, for example, optical processor 15 is coupled directly to optical amplifier 12.)

The term 'optical amplifier' is used here because the component which is referenced by that term is of the type commonly used as an optical amplifier. It should be noted that this component need not actually amplify the optical signal, and it is contemplated that it may have a gain of unity, or even less. On the other hand, it may often be convenient to use the present system to both generate an electrical copy of an optical signal and amplify the optical signal itself.

Figure 2:
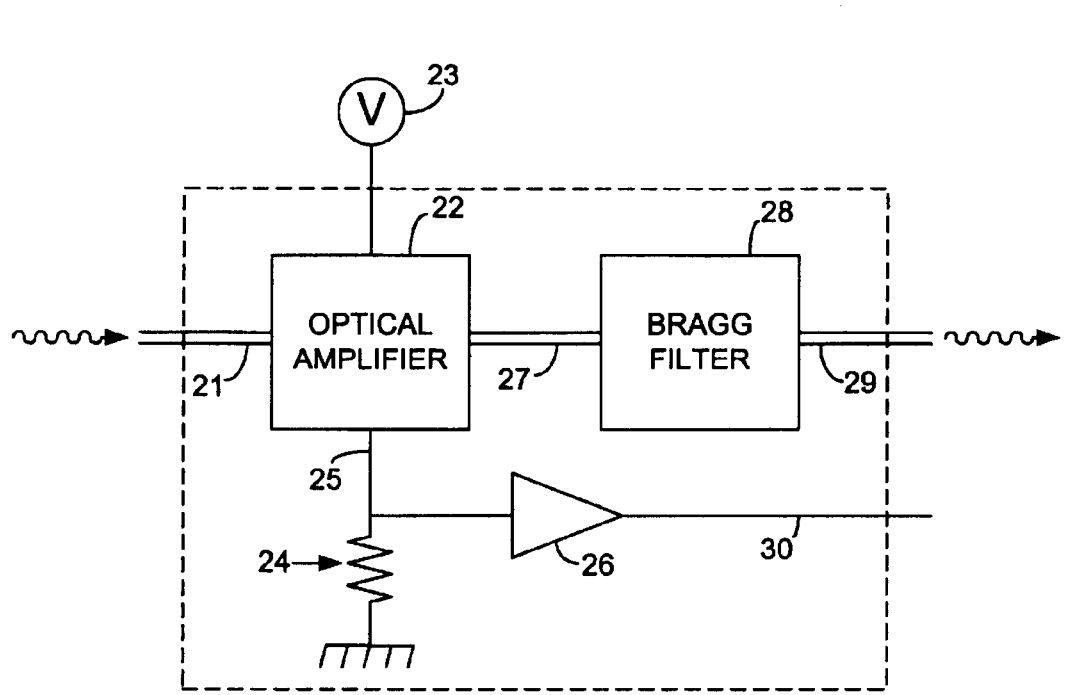
FIG. 2 is a diagram illustrating the configuration of a system in accordance with one embodiment of the invention.

Referring to FIG. 2, a diagram illustrating the configuration of a system in accordance with one embodiment of the invention is shown. In this embodiment, an optical signal is transmitted on optical fiber 21 to optical amplifier 22. The optical signal passes through optical amplifier 22 to intermediate optical fiber 27. Intermediate optical fiber 27 conveys the optical signal to Bragg filter 28. The filtered optical signal emerging from Bragg filter 28 is then transmitted over optical fiber 29.

A bias voltage is applied to optical amplifier 22 by power source 23. A bias resistor 24 couples power source 23 through optical amplifier 22 to ground. The bias current flows from source 23 through optical amplifier 22, line 25 and bias resistor 24, producing a signal voltage on line 25. This signal is amplified by operational amplifier 26 and output on line 30. (It should be noted that, although a voltage signal corresponding to the bias current is generated in this embodiment, current signal could also be generated.)

In one embodiment, the optical amplifier comprises a semiconductor optical amplifier. A semiconductor optical amplifier is 'pumped' with energy, either from a laser, or from an electrical source. If a laser is used to pump the semiconductor optical amplifier, it can be used to frequency shift the optical data signal (if the pumping laser has a different frequency than the optical signal) or simply to amplify the signal (if it has the same frequency.) If it is desired to pump the semiconductor optical amplifier electrically, a voltage is applied across the device to establish a population inversion. Generally speaking, it is easier to pump the semiconductor optical amplifier electrically, so this is the method which is most prevalent.

Figure 3A:
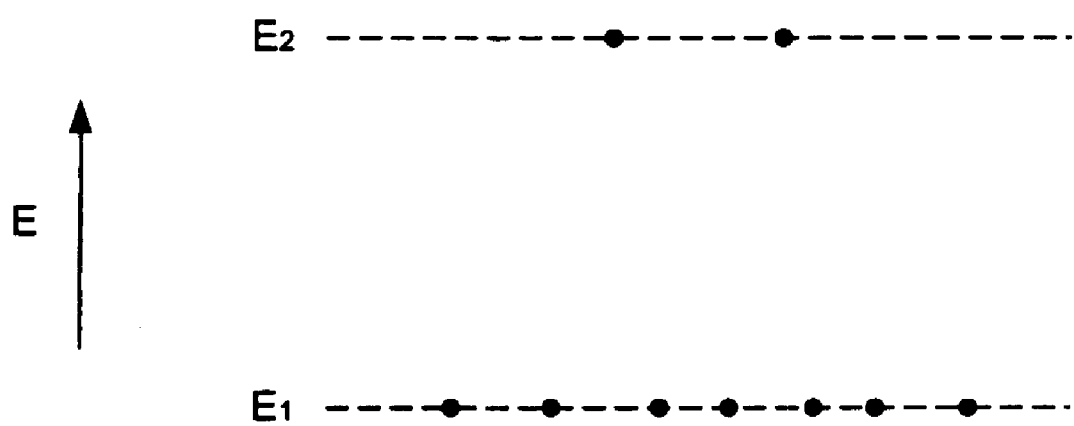
FIGS. 3A–3D are a set of diagrams illustrating the principle of stimulated emission.

A semiconductor optical amplifier operates on the principle of stimulated emission. Referring to FIGS. 3A-3D, a set of diagrams illustrating the principle of stimulated emission is shown. Referring to FIG. 3A, a diagram illustrating two energy states of atoms in the material of a semiconductor optical amplifier is shown. In this figure, the atoms, represented by the black dots, reside at one of two energy levels. Most of the atoms have a lower energy, $E_1$, while fewer have a higher energy, $E_2$. This is a normal state of the semiconductor optical amplifier material. It should be noted that the diagram represents a statistical state—the individual atoms typically will not remain at the same energy level indefinitely, but will instead move from one state to another with a frequency that is represented by the figure. That is, at any given time, a smaller number of atoms (e.g., two in the figure) will be at the higher energy level, while a larger number of atoms (e.g., seven in the figure) will be at the lower energy level.

Figure 3B:
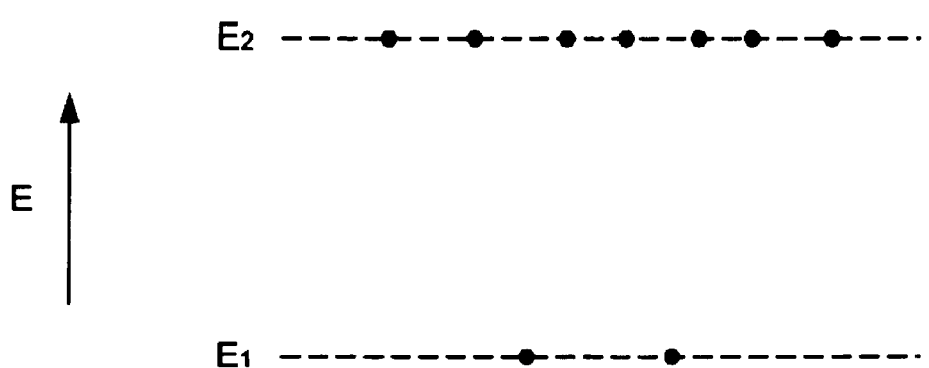

Referring to FIG. 3B, a diagram illustrating the energy states of atoms in the semiconductor optical amplifier material when it is "pumped" with energy from an external source is shown. In this figure, a larger number of atoms reside at the higher energy level, $E_2$, while a smaller number of atoms reside at the lower energy level, $E_1$. Because this condition is the reverse of the normal state of the material, it is referred to as a population inversion. This is a metastable state, as will be described in more detail below.

Figure 3C:
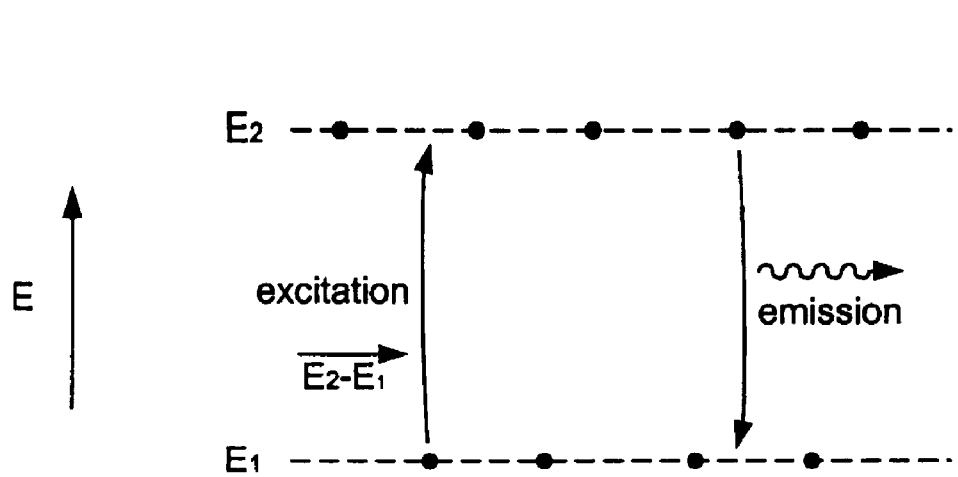

Referring to FIG. 3C, the movement of atoms between higher and lower energy levels is illustrated. The movement of an atom from a lower energy level to a higher energy level is referred to as excitation. This occurs when an atom absorbs sufficient energy ($E_2-E_1$) to move from the lower energy level to the higher energy level. In order to produce a population inversion, enough energy must be supplied to the material to elevate most of the atoms to the higher energy level. Providing this energy to the material is generally referred to as "pumping." The semiconductor optical amplifier material is typically pumped in one of two ways: by a laser; or by the application of a voltage to the material. In laser pumping, photons (which typically have energy of at least $E_2-E_1$) are directed into the material, where individual atoms may absorb the photons and consequently become excited (move to the higher energy level.) If the semiconductor optical amplifier material is electrically pumped, a voltage is applied across the material. As atoms absorb energy from the electric field and become excited, current is drawn from the power supply.

The movement of an atom from a higher energy level to a lower energy level causes the emission of a photon. The energy of the photon is equal to the energy which is lost by the atom in moving from the higher energy level to the lower energy level (i.e., $E_2-E_1$ in the figure.) Because the amplifier material is metastable, the movement of an atom from the higher energy level to the lower energy level and the accompanying emission of a photon may occur either spontaneously, or as a result of stimulation. The emission may be stimulated by the presence of a photon of nearly the same energy. This is the means by which the semiconductor optical amplifier material amplifies an optical signal—as a pulse of light passes through the material, it stimulates the emission of other photons which reinforce (amplify) the signal. The spontaneous emission of photons occurs with a statistical randomness and creates noise in the optical signal.

Figure 3D:
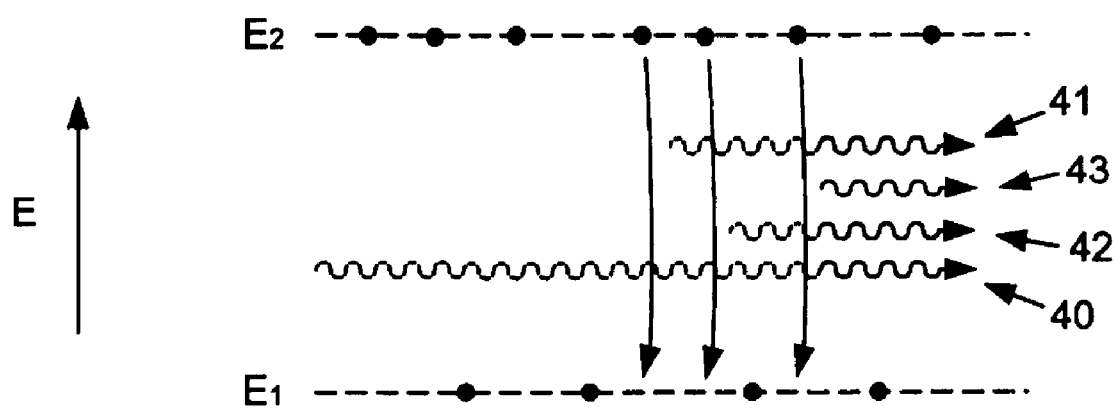

Referring to FIG. 3D, a diagram illustrating the amplification of a pulse of light passing through the material of a semiconductor optical amplifier is shown. In this figure, a photon 40 is shown passing through the material. (The photon is shown by a solid line—the dotted line is used to indicate that the photon has passed through the material and was at a different position at an earlier point in time.) As photon 40 passes through the material, it stimulates the emission of other photons—first photon 41, then photon 42, then photon 43. The photons are coherent and highly directional. (It should be noted that the spontaneous emission of photons which causes noise in the optical signal is not illustrated in FIG. 3D.)

Electrically pumped semiconductor optical amplifiers exhibit high impedance when they are in a state of population inversion. After the population inversion collapses and most of the atoms return to lower energy states.(i.e., the atoms have been stimulated and have caused the emission of corresponding photons,) the impedance of the semiconductor optical amplifier also falls. The current which is drawn from the power supply by the semiconductor optical amplifier increases as the population inversion collapses and decreases as the population inversion is re-established. Because the collapse of a population inversion corresponds to a pulse of light passing through the semiconductor optical amplifier (which causes the collapse,) and the re-establishment of the population inversion corresponds to the absence of light passing through the semiconductor optical amplifier (allowing the atoms to fill the excited states,) the current which is drawn from the power supply corresponds to the optical signal which is passed through the semiconductor optical amplifier and embodies the same data stream. Thus, the power supply current serves to mimic the optical signal. It can therefore be used to provide an electrical copy of the optical data stream without the necessity of terminating the optical data stream. In the embodiment of FIG. 2, the current signal is converted to a voltage signal by inserting resistor 24 in series with the semiconductor optical amplifier. The bias voltage applied by power supply 23 is substantially constant (that is, although it may vary slightly, the voltage remains at nearly the same level.) Consequently, when the impedance of the optical amplifier is low and the bias current is high, a higher voltage is developed across the resistor. When the impedance of the optical amplifier is high and the bias current is low, a lower voltage is developed across the resistor.

The semiconductor optical amplifier should be manufactured using a material which is acceptably fast. semiconductor optical amplifier materials have corresponding characteristic relaxation times. This is the amount of time which it takes for a population inversion in the material to collapse, or for a population inversion to be re-established. If the optical signal with which the semiconductor optical amplifier is to be used has a data rate which is on the order of a gigahertz, the relaxation time should be less than 100 picoseconds. (Although the semiconductor optical amplifier can be slower in some embodiments, this will degrade the quality of the electrical copy of the signal.) If a semiconductor optical amplifier is fast enough to switch the data in the optical signal, it is, most likely, fast enough to use in the present systems and methods. In the preferred embodiment, a semiconductor optical amplifier which employs gallium arsenide or iridium phosphide (which have relaxation times on the order of tens of picoseconds) may be chosen to handle gigahertz optical signals. It should be noted that erbium doped fibers, which are commonly used as optical amplifiers, have relaxation times which may be measured in milliseconds and should therefore be used in applications in which data rates are relatively low. Generally speaking, however, these devices are not suitable for higher-speed data applications.

It should be noted that semiconductor optical amplifier materials which have very short relaxation times and are useful for the present applications tend to have a lot of metastable collapse. That is, they are typically prone to have more spontaneous emission of photons than slower materials. Fast semiconductor optical amplifiers are therefore typically very noisy. In conventional design, the teaching is to avoid these noisy amplifiers, particularly in dense wavelength systems where the noise is injected into many different channels (wavelengths.) Generally speaking then, the types of semiconductor optical amplifier which are suitable for the present applications are the same ones which are avoided in conventional designs.

Likewise, the present systems and methods make use of information in the bias current which is conventionally regarded as noise and therefore sought to be eliminated. In conventional systems, variations in the current drawn from the power supply are normally undesirable. Typically, a "stable" power supply is desired. In fact, a great deal of effort is often expended on the filtering of bias currents to minimize variations and thereby simplify the design and manufacture of the power supply. Often, a comb filter will be used for this purpose. The present invention thus goes against conventional teachings. In fact, it may be preferable in embodiments of the present system to use optical amplifiers which are somewhat inefficient and consequently have a higher bias current than would be desirable in conventional systems. The higher current would increase the amplitude of the electrical copy of the signal.

While the bias current drawn by the optical amplifiers in the present systems and methods typically is not filtered, it may be desirable to filter the amplified optical signal. Referring again to the example depicted in FIG. 2, a Bragg filter is placed in the optical path following the optical amplifier. The Bragg filter is used to filter out of the optical signal some of the noise which is created by spontaneous emission of photons in the amplifier material.

Figure 4:
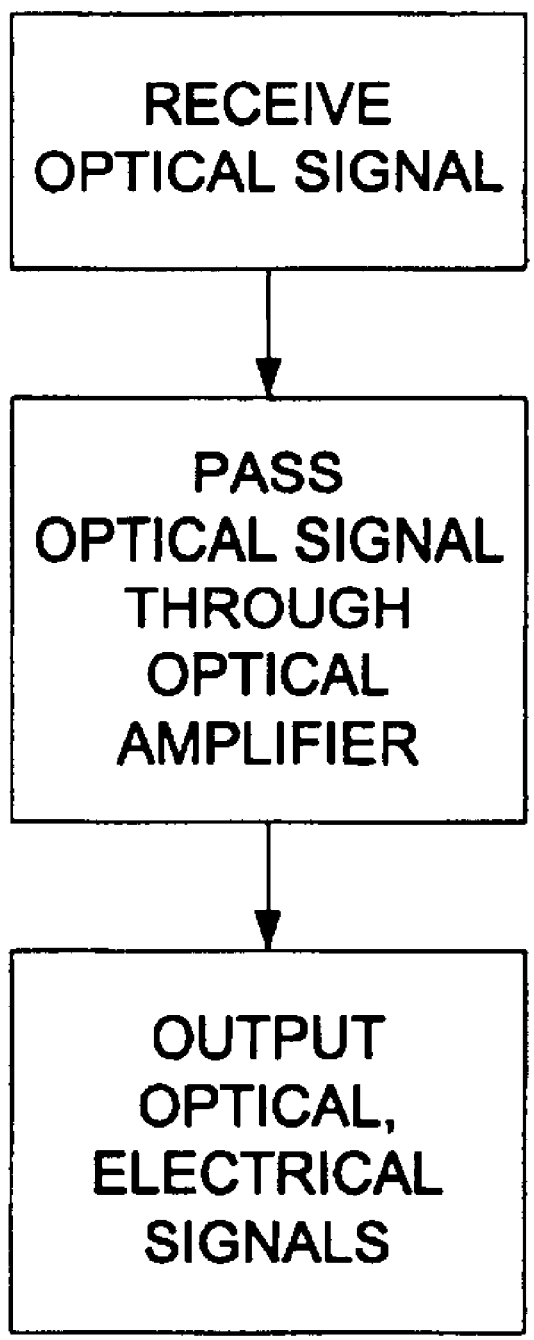
FIG. 4 is a flow diagram illustrating a method in accordance with one embodiment of the present invention.

Referring to FIG. 4, a flow diagram illustrating a method in accordance with one embodiment of the present invention is shown. This figure illustrates a very simple embodiment in which an optical signal is received and passed through an electrically biased optical amplifier, providing as outputs both the optical signal and an electrical copy of the optical signal. As indicated above, this method is distinctive from conventional methods, which terminate the optical signal and generate an electrical signal which is processed and/or forwarded in place of the optical signal.

Figure 5:
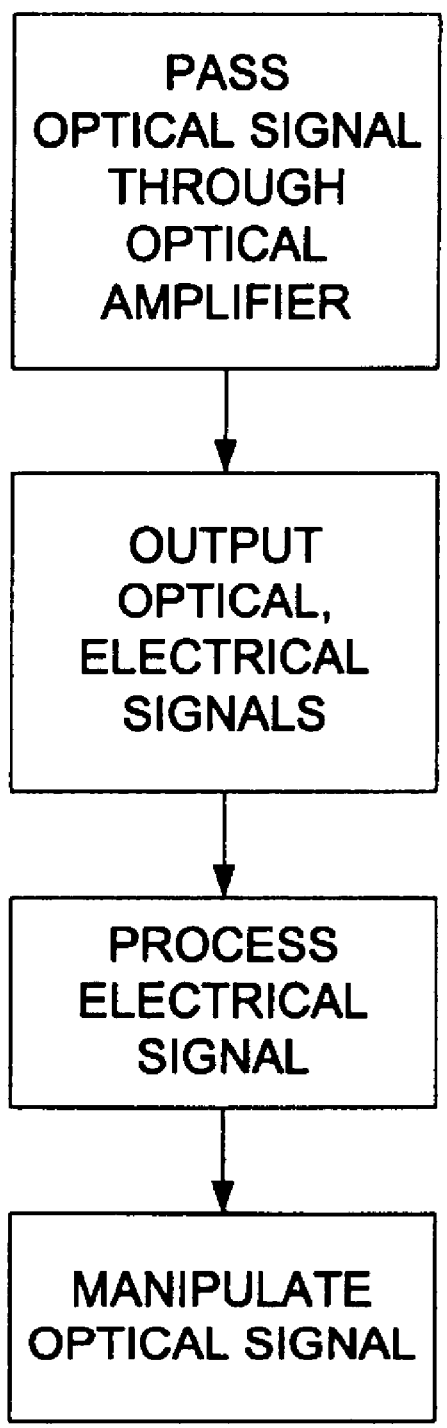
FIG. 5 is a flow diagram illustrating a method in accordance with another embodiment of the present invention.

Referring to FIG. 5, a flow diagram illustrating a method in accordance with another embodiment of the present invention is shown. In this embodiment, an optical signal is again passed through a optical amplifier, and both the optical signal and an electrical copy of the optical signal are provided. In this embodiment, however, the method includes processing the electrical copy of the signal and manipulating the optical signal based upon the processing of the electrical copy.

As explained above, in conventional systems,.data embodied in optical signals cannot be directly accessed. Optical signals have to be converted into electrical signals so that they can be processed and manipulated. For instance, in the case of optical data which must be routed, an optical signal is conventionally converted into an electrical signal so that the data embodied in the signal can be determined. This data is read them from the electrical signal, a routing decision is made based upon this data, and the electrical signal is converted back into an optical signal for forwarding according to the routing decision. In some cases, the electrical signal may also be manipulated (e.g., by stripping away the original routing information and replacing it with new routing information) before it is converted back into an optical signal and forwarded.

Because the present systems and methods provide an electrical copy in addition to the optical signal, rather than in place of the optical signal, the contents of the optical signal can be determined by reading the electrical signal. Thus, routing decisions or other processing of the data can take place without having to terminate the optical signal. In the case of an optical signal which must be routed, the original optical signal can be routed according to the decision based on the electrical copy of the data, rather than making the routing decision and then having to convert the electrical signal back into an optical signal which can then be forwarded.

Referring again to FIG. 1, a system configured to process the original optical signal is illustrated. In this embodiment, optical processor 15 is configured to receive both the original optical signal (via transmission medium 13) and the electrical copy of the signal (via line 14.) While the data streams of these two signals are temporally aligned when they are received by optical processor 15, the processing of the electrical signal requires a finite amount of time. During this time, the optical signal must be delayed. Optical processor 15 therefore employs a delay loop (not shown) which is coupled to receive the optical signal and to deliver it to an optical processing mechanism with an optical processor 15 after a certain delay. The delay loop simply comprises a length of optical fiber which is placed in the optical path to lengthen it and thereby delay the optical signal which is transmitted over that path. Thus, optical processor 15 has time to process the electrical copy of the signal, make a routing or manipulation decision, and then directly process the optical signal based upon this decision. The processing of the optical signal may consist of something as simple as routing the signal, or as complex as effectuating the same type of data manipulation which is conventionally performed on the electrical signal (e.g., replacement of original routing information with new routing information.) In the latter case, the optical signal may be optically chopped and combined with new data to modify selected bits within the data stream of the signal. By modifying the optical directly, the conventional step of converting a modified electrical signal into an optical signal is eliminated.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated.that these variations, modifications, additions and improvements fall within the scope of the invention as detailed within the following claims.

What is claimed is:

1. A method for reading data content out of an optical data stream without altering the optical data stream, comprising:
   receiving an optical signal, wherein the optical signal embodies a data stream;
   passing the optical signal through an electrically biased optical amplifier;
   providing the optical signal as a first output of the optical amplifier; and
   providing a second output of the optical amplifier corresponding to a bias current across the optical amplifier, wherein the bias current embodies the data stream;
   wherein providing the second output of the optical amplifier corresponding to a bias current across the optical amplifier comprises providing a voltage generated by the bias current across a bias resistor.

2. The method of claim 1 further comprising amplifying the voltage generated by the bias current across the bias resistor.

3. A method comprising:
   applying a bias voltage across an optical amplifier;
   passing an optical signal through the optical amplifier; and
   providing an electrical output signal corresponding to a bias current across the optical amplifier wherein the electrical output signal embodies the data stream;
   wherein a data stream embodied in the optical signal is unaltered after passing through the optical amplifier.

4. A method comprising:
   applying a bias voltage across an optical amplifier;
   passing an optical signal through the optical amplifier; and
   providing an electrical output signal corresponding to a bias current across the optical amplifier wherein the electrical output signal embodies the data stream;
   wherein providing the electrical output signal comprises providing a voltage generated by the bias current across a bias resistor.

5. The method of claim 4 further comprising amplifying the voltage generated by the bias current across the bias resistor.

6. A device comprising:
   an optical amplifier configured to be electrically biased;
   an input of the optical amplifier configured to receive an optical signal embodying a data stream;
   an optical output of the optical amplifier configured to provide the optical signal;
   an electrical output of the optical amplifier configured to provide an electrical signal embodying the data stream; and
   a bias resistor coupled in series with the optical amplifier and wherein a bias voltage is applied across the bias resistor and the optical amplifier.

7. The device of claim 6 wherein the electrical signal corresponds to a voltage across the bias resistor.

8. The device of claim 6 wherein the bias voltage is substantially constant.

9. A device comprising:
   an optical amplifier configured to be electrically biased;
   an input of the optical amplifier configured to receive an optical signal embodying a data stream;
   an optical output of the optical amplifier configured to provide the optical signal; and
   an electrical output of the optical amplifier configured to provide an electrical signal embodying the data stream;
   an amplifier coupled to amplify the electrical signal; and
   a bias resistor coupled in series with the optical amplifier, wherein the electrical signal corresponds to a voltage across the bias resistor.

10. A device comprising:
    an optical amplifier configured to be electrically biased;
    an input of the optical amplifier configured to receive an optical signal embodying a data stream;
    an optical output of the optical amplifier configured to provide the optical signal; and
    an electrical output of the optical amplifier configured to provide an electrical signal embodying the data stream;
    wherein the optical amplifier draws a bias current and wherein the bias current is unfiltered.

11. A device comprising:
    an optical amplifier configured to be electrically biased;
    an input of the optical amplifier configured to receive an optical signal embodying a data stream;
    an optical output of the optical amplifier configured to provide the optical signal;
    an electrical output of the optical amplifier configured to provide an electrical signal embodying the data stream; and
    a power supply, wherein the power supply is configured to not minimize bias current fluctuations.

12. The device of claim 11 further comprising an optical processor coupled to the optical output and the electrical output of the optical amplifier and configured to receive the optical signal and the electrical signal.

13. The device of claim 12 wherein the optical processor is configured to process the electrical signal and to modify the data stream embodied in the optical signal based upon the results of processing the electrical signal.

14. The device of claim 13 wherein the optical processor comprises a delay line coupled to the optical output of the optical amplifier and configured to delay the optical signal by an interval of time which is no less than an amount of time required to process the electrical signal.

15. The device of claim 12 wherein the optical processor is configured to process the electrical signal and to route the optical signal based upon the results of processing the electrical signal.

16. The device of claim 13 wherein the optical processor is configured to manipulate the optical signal by directly modifying one or more bits of the data stream embodied in the optical signal.

17. A system comprising:

an optical amplifier configured to receive an optical signal embodying a data stream, to provide the optical signal as an output, and to provide an electrical signal as an output, wherein the electrical signal embodies the data stream;

a power supply configured to apply a bias voltage to the optical amplifier; and an optical processor coupled to the optical amplifier and configured to receive the optical signal and the electrical signal, wherein the optical processor is configured to process the electrical signal and to manipulate the optical signal based upon the results of processing the electrical signal, and wherein the optical processor is configured to manipulate the optical signal by routing the optical signal.

18. A system comprising:

an optical amplifier configured to receive an optical signal embodying a data stream, to provide the optical signal as an output, and to provide an electrical signal as an output, wherein the electrical signal embodies the data stream;

a power supply configured to apply a bias voltage to the optical amplifier; and an optical processor coupled to the optical amplifier and configured to receive the optical signal and the electrical signal, wherein the optical processor is configured to process the electrical signal and to manipulate the optical signal based upon the results of processing the electrical signal, and wherein the optical processor is configured to manipulate the optical signal by directly modifying one or more bits of the data stream embodied in the optical signal.

19. A system comprising:

an optical amplifier configured to receive an optical signal embodying a data stream, to provide the optical signal as an output, and to provide an electrical signal as an output, wherein the electrical signal embodies the data stream;

a power supply configured to apply a bias voltage to the optical amplifier;

an optical processor coupled to the optical amplifier and configured to receive the optical signal and the electrical signal, wherein the optical processor is configured to process the electrical signal and to manipulate the optical signal based upon the results of processing the electrical signal; and a bias resistor coupled in series with the optical amplifier, wherein the electrical signal corresponds to a voltage across the bias resistor.

20. The system of claim 19 further comprising an amplifier coupled to amplify the electrical signal.

* * * * *